United States Patent
Kobayashi

[11] Patent Number: 5,883,754
[45] Date of Patent: Mar. 16, 1999

[54] RECORDING AND/OR REPRODUCING APPARATUS HAVING A CASSETTE-LID OPENING MECHANISM

[75] Inventor: Junji Kobayashi, Tokyo, Japan

[73] Assignee: Canon Kabushiki Kaisha, Tokyo, Japan

[21] Appl. No.: 734,491

[22] Filed: Oct. 21, 1996

Related U.S. Application Data

[63] Continuation of Ser. No. 326,326, Oct. 20, 1994, abandoned.

[30] Foreign Application Priority Data

Oct. 29, 1993 [JP] Japan .................................. 5-294688

[51] Int. Cl.$^6$ ..................... G11B 15/675; G11B 15/665
[52] U.S. Cl. .................................... 360/96.5; 360/96.6
[58] Field of Search ................................ 360/96.5, 96.6, 360/84, 85, 92, 93, 132; 242/347, 347.1, 347.2, 338, 338.4

[56] References Cited

U.S. PATENT DOCUMENTS

| | | | |
|---|---|---|---|
| 4,484,240 | 11/1984 | Yoshida | 360/96.5 |
| 4,794,477 | 12/1988 | Hashiguchi et al. | 360/96.5 |
| 4,796,117 | 1/1989 | Fleck | 360/96.5 |
| 5,008,766 | 4/1991 | Chigasaki | 360/96.5 |
| 5,289,324 | 2/1994 | Katoku et al. | 360/96.5 |
| 5,327,306 | 7/1994 | Kondo et al. | 360/96.5 |

FOREIGN PATENT DOCUMENTS

| | | | |
|---|---|---|---|
| 60-191488 | 9/1985 | Japan | 360/96.5 |
| 61-24046 | 2/1986 | Japan | 360/96.5 |
| 63-247953 | 10/1988 | Japan | 360/96.5 |
| 63-263661 | 10/1988 | Japan | 360/96.5 |
| 2-156460 | 6/1990 | Japan | 360/96.5 |
| 5-217250 | 8/1993 | Japan | 360/96.5 |

*Primary Examiner*—David L. Ometz
*Attorney, Agent, or Firm*—Robin, Blecker & Daley

[57] ABSTRACT

A cassette-lid opening device opens a lid of a cassette as the cassette moves downward from a raised position to a lowered position. The cassette has a front end at which the lid is located and a rear end. The device has an opening member arranged to be movable relative to the cassette and to open the cassette lid as the cassette moves downward. An urging member urges the opening member toward the cassette and a restricting element restricts the position of the opening member so as to cause the opening member to be located further away from the cassette rear end when the cassette is in the raised position than when the cassette is in the lowered position. The restricting element may be part of a holder for the cassette or a part of a cassette holder lowering/raising mechanism.

17 Claims, 5 Drawing Sheets

RECORDING AND/OR REPRODUCING APPARATUS HAVING A CASSETTE-LID OPENING MECHANISM

This is a continuation application under 34 CRF 1.62 of prior application Ser. No. 08/326,326, filed Oct. 20, 1994 now abandoned.

BACKGROUND OF THE INVENTION

1. Field of the Invention this invention relates to a cassette-lid opening mechanism for turning the lid of a cassette in the direction of opening the lid as the cassette moves downward from a raised position in a video cassette recorder (hereinafter referred to as VCR) or the like.

2. Description of the Related Art

It is well known that, after a cassette is inserted into a holder provided in a VCR, the cassette is moved down along with the holder as the holder descends to a lowered position (a loading position) from a raised position (an inserting position). The cassette lid which is disposed to be swingable on the front side of the cassette is opened as the cassette moves down, so that a tape contained in the cassette can be pulled out.

A cassette-lid opening member is secured to the upper-side of the chassis of the VCR body. The cassette lid comes to about on the opening member during the descent of the cassette. The opening member then pushes the cassette lid by its relative motion to swing the lid in the direction of opening the lid. As a result, the cassette lid is kept open when the cassette is in the lowered position.

According to the conventional arrangement, the cassette-lid opening member is fixed to the chassis. The opening angle of the cassette lid, therefore, tends to be caused to vary by the dimensional tolerance of parts of the opening member itself and the assembled position of the opening member. In some case, a part of the tape pulled out from inside of the cassette touches the lid of the cassette due to an insufficient opening angle of the lid. Then, an attempt to completely open the cassette lid might cause the lid to be damaged by an excessive force applied to the lid. The conventional arrangement, therefore, has necessitated a severe degree of precision for the parts and assembly work thereon.

SUMMARY OF THE INVENTION

This invention has been developed to solve the above-stated problem. It is, therefore, an object of this invention to provide a cassette-lid opening device which is capable of easily, reliably and completely opening the cassette lid in a natural manner as the the cassette makes a descent from its inserted position.

To attain this object, a cassette-lid opening device for opening a lid of a cassette as the cassette moves downward from a raised position to a lowered position is arranged as an embodiment of this invention to include an opening member arranged to be movable relative to the cassette and to abut on the cassette lid as the cassette moves downward, an urging member arranged to urge the opening member toward the cassette, and restricting means for restricting the position of the opening member so as to cause the opening member to be located less toward the rear of the cassette when the cassette is in the raised position than when the cassette is in the lowered position.

Further, to attain the object from a different viewpoint, a recording or reproducing apparatus for recording information on or from a recording medium contained in a cassette is arranged as an embodiment of this invention to include a cassette holder arranged to hold the cassette inserted into the apparatus in such a way as to move the cassette upward and downward between a raised position and a lowered position, an opening member arranged to be movable relative to the cassette and to abut on a lid of the cassette as the cassette moves downward, an urging member arranged to urge the opening member toward the rear of the cassette inserted into the cassette holder, and restricting means for restricting the position of the opening member so as to cause the opening member to be located less toward the rear of the cassette inserted into the cassette holder when the cassette is in the raised position than when the cassette is in the lowered position.

The above and other objects and features of this invention will become apparent from the following detailed description of embodiments thereof taken in connection with the accompanying drawings.

DETAILED DESCRIPTION OF THE PREFERRED EMBODIMENTS

A cassette-lid opening mechanism of a VCR to which this invention is applied as a first embodiment thereof is described below with reference to the drawings.

Figure 1:
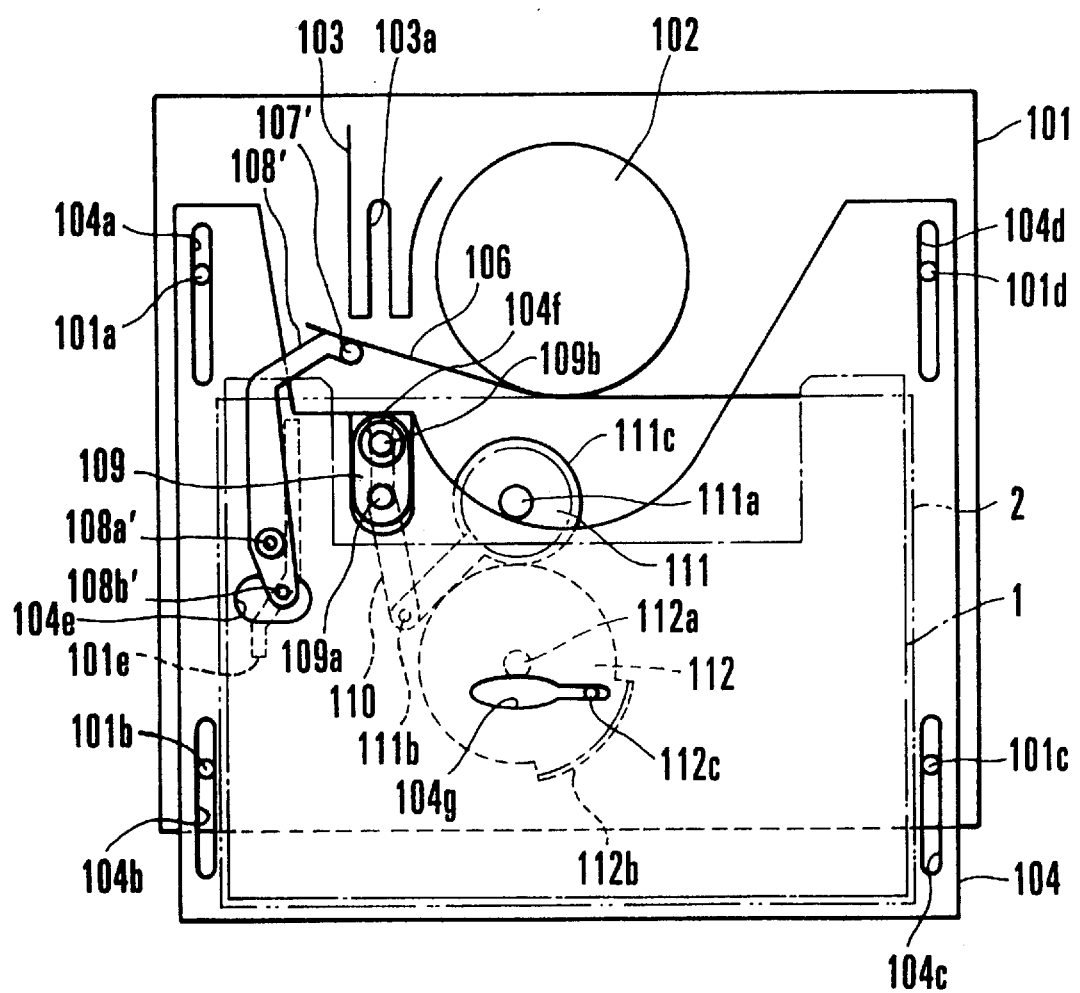
FIG. 1 is a plan view showing in outline a VCR which is arranged as an embodiment of this invention.

FIG. 1 shows in outline a VCR arranged as the first embodiment of this invention. To make the illustration clearly understandable, parts covered with a cassette holder 2 are shown in a look-through manner. The illustration includes a main chassis 101. A rotary drum 102 is set on the main chassis 101. A fixed rail 103 is set on the main chassis 101. A slide chassis 104 is arranged to have a reel mount (not shown) etc., set thereon. Guide pins 101a to 101d which are erected on the main chassis 101 are slidably fitted into slot parts 104a to 104d formed in the slide chassis 104. A magnetic tape 106 is contained in a cassette 1. A part of the magnetic tape 106 is exposed in a front part of the cassette 1.

A post 107' is set on one end of a support lever 108'. The post 107' and the support lever 108' constitute a tape pull-out guide. The support lever 108' is set on the slide chassis 104 to be swingable on a support shaft 108a'. A pin 108b' is set on the other end of the support lever 108' and engages a slot 101e of the main chassis 101 through a hole 104e formed in the slide chassis 104. One end of a brake band (not shown) which is wrapped around the reel mount is attached to the end part of the support lever 108' where the pin 108b' is set. The tension of the tape 106 imparted to the post 107' is adjusted by the support lever 108' and the brake band. A post 109b is set on a slider 109. The slider 109 serves as a tape wrapping guide for wrapping the magnetic tape 106 around the rotary drum 102. The slider 109 is arranged to be capable of slidably engaging a separate type rail part which consists of a groove part 103a of the fixed rail 103 and a groove part 104f of the slide chassis 104.

A first arm 110 engages the slider 109 through a connection pin 109a in a swingable manner. A second arm 111 has a toothed part 111c formed along its periphery and is supported by a support shaft 111a on the main chassis 101 in a swingable manner. The second arm 111 is provided with a connection pin 111b formed at one end thereof and engages the first arm 110 through the connection pin 111b in a swingable manner.

A slide gear 112 is supported by a support shaft 112a on the main chassis 101 in a swingable manner and is arranged to be driven by a driving mechanism which is not shown. A toothed part 112b which is capable of engaging the toothed part 111c of the second arm 111 is formed along a peripheral part of the slide gear 112. Further, the slide gear 112 is provided with a slide pin 112c which is set near the periphery of the slide gear 112 and is arranged to engage a groove part 104g of the the slide chassis 104. An arc part of the groove part 104g is arranged to become concentric with the center 112a of the slide gear 112 at an outer arc which comes into contact with the slide pin 112c before and after a tape loading action.

With the apparatus arranged in the above-stated manner, the embodiment features in the following points.

Figure 2:
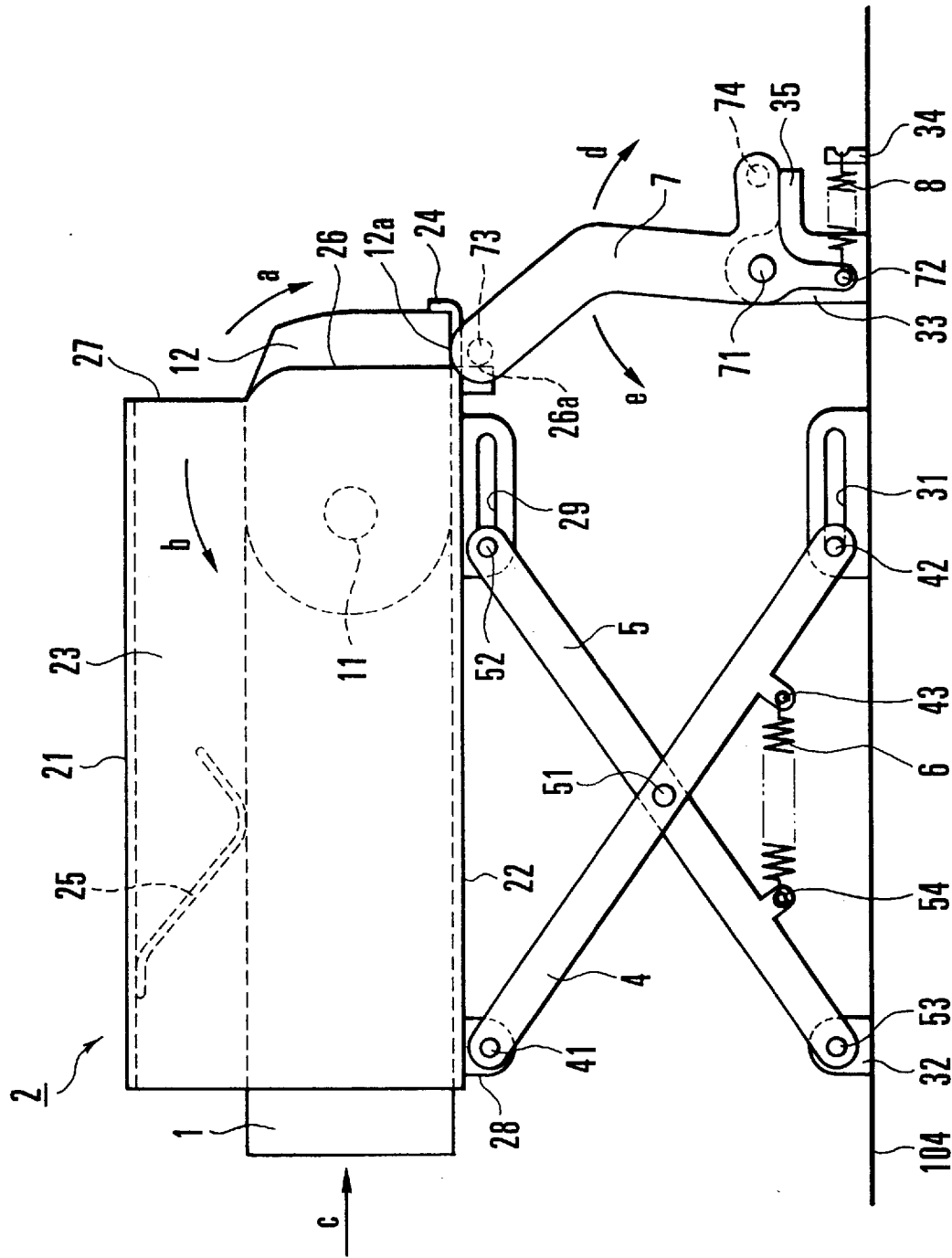
FIG. 2 is a side view showing a cassette-lid opening mechanism of the embodiment in a state obtained with a cassette moved upward.
Figure 3:
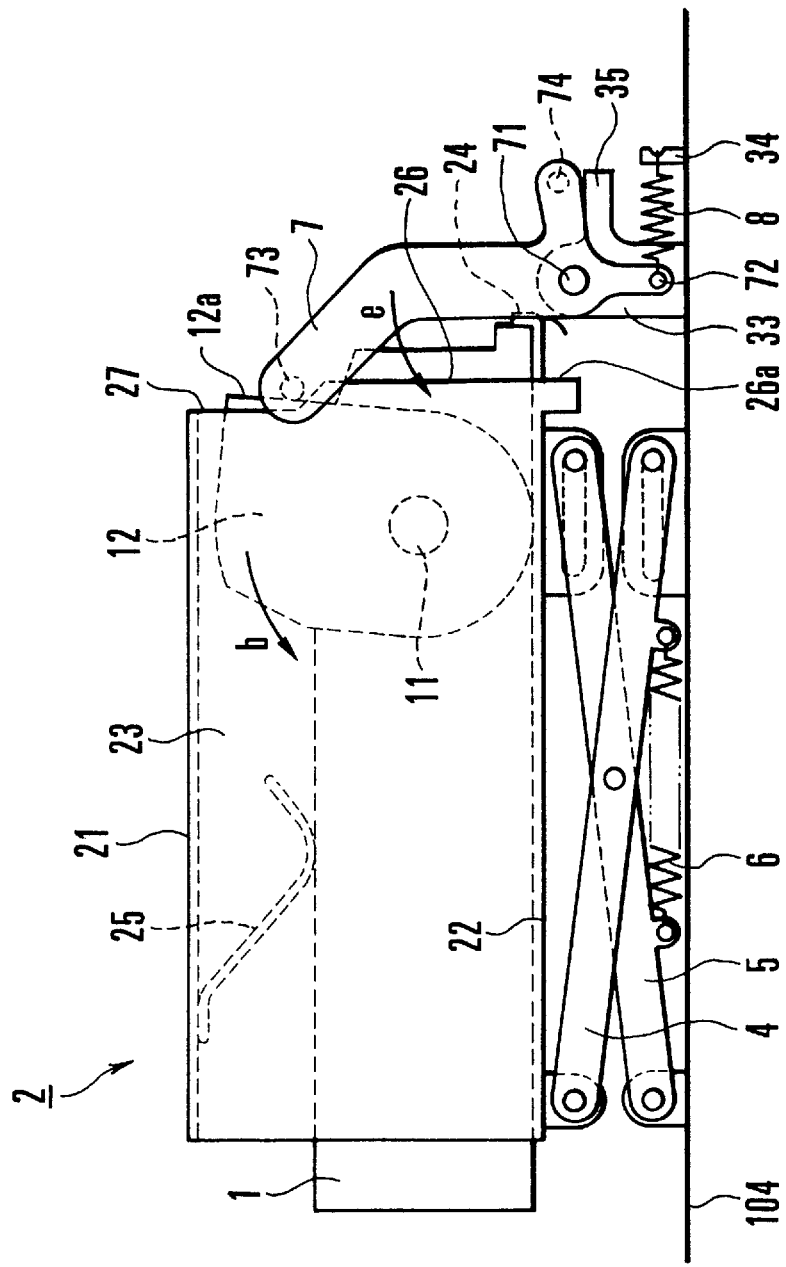
FIG. 3 is a side view showing the embodiment in a state obtained with the cassette moved toward.

FIGS. 2 and 3 show in side views the cassette-lid opening mechanism of the embodiment in a state of having the cassette in the raised position and in a state having the cassette in the lowered position, respectively. Referring to FIGS. 2 and 3, the cassette 1 is provided with a cassette lid 12. The cassette lid 12 is swingable on a support shaft 11 in the directions of arrows "a" and "b". The cassette lid 12 is normally urged to move in the direction of arrow "a" into a closed state by a lid closing spring which is not shown.

A cassette holder 2 is arranged to allow the cassette 1 to be inserted into it in the direction of arrow "c" as shown in FIG. 2. The cassette holder 2 is composed of an upper plate 21, a bottom plate 22 and side plates 23. The cassette 1 inserted into the cassette holder 2 comes to a stop by abutting on a stopper 24 provided at the front end of the bottom plate 22 and is pressed from above by a leaf spring 25 attached to the reverse side of the upper plate 21.

In the case of this embodiment, a front end edge of the side plate 23 is formed jointly by a restricting part 26 which forms a lower part and an escape part 27 which forms an upper part. The restricting part 26 and the escape part 27 form the front end edge of the side plate 23 with a stepped difference between their front positions in the front and rear directions of the cassette 1. A protruding piece 26a is formed to continue from the restricting part 26.

A pair of arms 4 and 5 are arranged to cause the cassette holder 2 to ascend and descend. A pin 51 connects the arms 4 and 5 to each other in such a way as to allow them to turn on the pin 51. A pin 41 which is provided at one end of the arm 4 rotatably engages a support part 28 of the cassette holder 2. A pin 42 which is provided at the other end of the arm 4 slidably engages a guide slot 31 provided on the chassis 104. A pin 52 provided at one end of the arm 5 slidably engages a guide slot 29 of the cassette holder 2. A pin 53 provided at the other end of the arm 5 rotatably engages a support part 32 provided on the chassis 104. An uplifting spring 6 is stretched between a spring attaching part 43 of the arm 4 and a spring attaching part 54 of the arm 5.

An opener 7 which is a cassette-lid opening member is supported by a support part 33 of the chassis 104 through a support shaft 71 provided at the lower end of the opener 7. The opener 7 is arranged to be swingable relative to the cassette 1, i.e., in the directions of arrows "d" and "e". An urging spring 8 is stretched between a spring attaching part 72 of the opener 7 and a spring attaching part 34 of the chassis 104. The urging spring 8 is thus arranged to urge the opener 7 to swing in the direction of arrow "e". An opener pin 73 which extends laterally across the upper end of the opener 7 is arranged to be able to abut on the lower edge 12a of the side face of the cassette lid 12 and the restricting part 26 of the cassette holder 2 which includes the protruding piece 26a. Any excessive swing of the opener 7 in the direction of arrow "d" is prevented by a stopper 35 which is provided on the support part 33 of the chassis 104 to have a pin 74 of the opener 7 abut thereon.

With the embodiment arranged in the above-stated manner, in a state of having the cassette in the raised position as shown in FIG. 2, the opener 7 which is urged by the urging spring 8 to swing in the direction of arrow "e" is abutting on the protruding piece 26a of the restricting part 26 of the cassette holder 2. Therefore, the position of the opener 7 is restricted so as to be located as illustrated in a state of having been swung in the direction of arrow "d".

When the cassette holder 2 is moved down against the force of the uplifting spring 6, the opener pin 73 comes to abut on the lower edge 12a of the side face of the cassette lid 12. At this moment, since the opener pin 73 is abutting on the restricting part 26, the opener pin 73 pushes a point of the cassette lid 12 located away from the support shaft 11 in the front of the cassette 1. Therefore, the opener pin 73 causes the cassette lid 12 to turn in the direction of arrow "b" as the cassette holder 2 descends. The cassette lid 12 thus can be easily and reliably opened without increasing a load on the cassette-lid opening action.

The opener pin 73 moves to a position above the restricting part 26 accordingly as the cassette holder 2 descends. Then, since the escape part 27 is set back toward the rear of the cassette 1 above the restricting part 26 so as to escape the opener pin 73, the position of the opener 7 is freed from restriction imposed by the restricting part 26 and is allowed to be swung by the urging spring 8 in the direction of arrow "e". The cassette lid 12 is thus gradually opened by the opener 7.

When the cassette holder 2 descends further to be in a state shown in FIG. 3, the holder 2 is locked to the chassis 104 by a lock means which is not shown.

The opener pin 73 then abuts on the cassette lid 12 in a state of having moved further in the direction of arrow "e" than when the opener pin 73 abuts on the restricting part 26 of the cassette holder 2. The cassette lid 12 is thus pushed by the opener pin 73 until the cassette lid 12 comes to a complete stop. The opener pin 73 never abuts on the escape part 27, so that the cassette lid 12 can be completely opened to a maximum extent without exerting any excessive force on the cassette lid 12.

Under a condition thus obtained, the chassis 104 is moved in the direction of bringing the cassette 1 close to the rotary drum 102 which is shown in FIG. 1. The tape 106 is then wrapped a predetermined angle around the rotary drum 102 to permit recording or reproduction on or from the tape 106.

After completion of recording or reporduction, the tape 106 is unloaded and stowed in the cassette 1. The chassis 104 is moved to a maximum extent in the direction of moving the cassette away from the rotary drum 102. The cassette holder 2 is unlocked in this state. The cassette holder 2 then moves upward from the state of FIG. 3 to the state of FIG. 2. The opener 7 is caused to swing by an action performed in a manner reverse to the action mentioned above. While the ascent of the cassette holder 2 is in process, the opener pin 73 moves downward relative to the ascent of the cassette holder 2. A lid closing spring (not shown) then acts to turn the cassette lid 12 in the direction of arrow "a" so as to close the cassette lid 12.

The arrangement of this embodiment requires only the front end edge of the side plate 23 of the cassette holder 2 to be formed to have the restricting part 26 and the escape part 27 which is set back from the restricting part 26, so that the action of the opener 7 can be restricted and controlled by a very simple arrangement.

Figure 4:
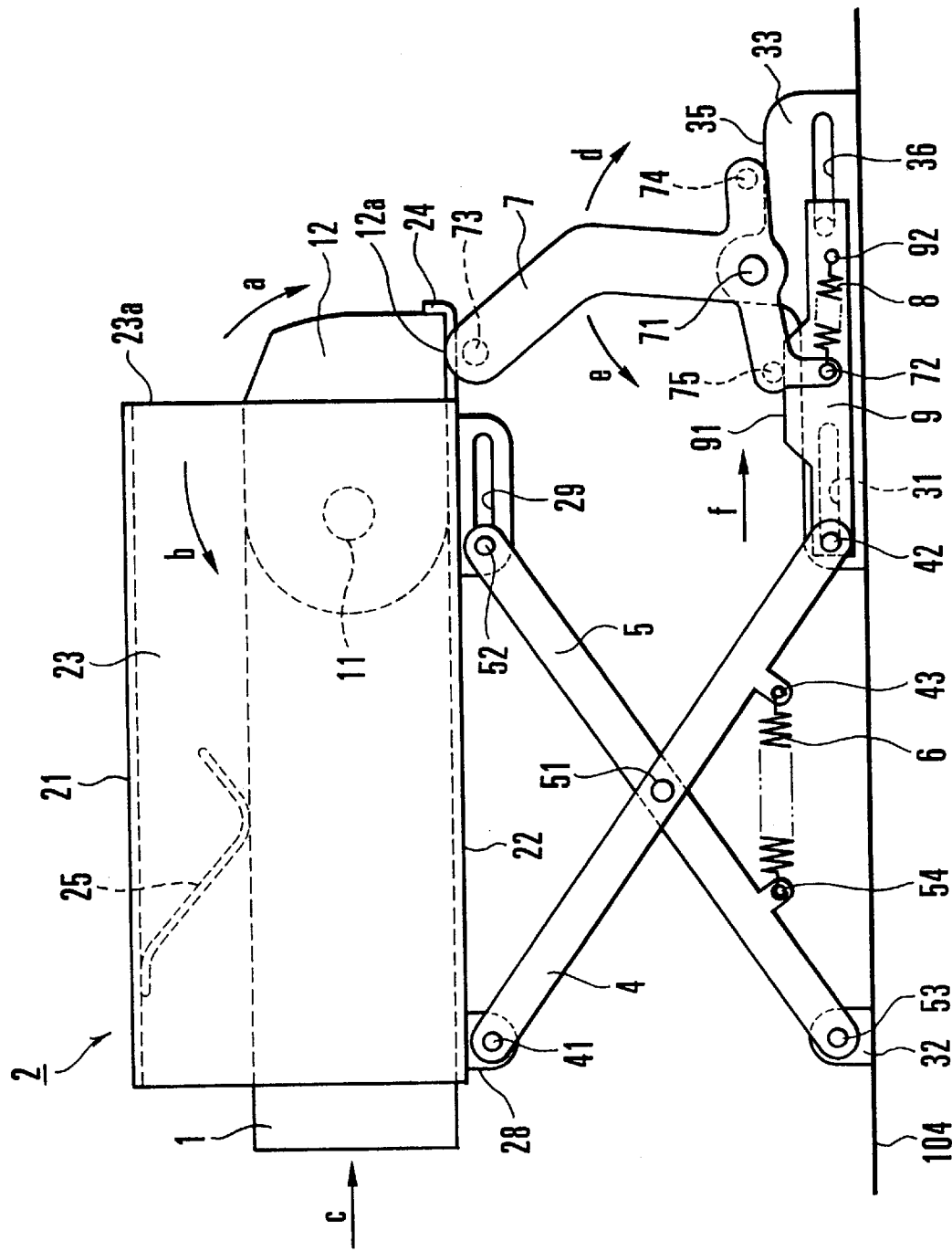
FIG. 4 is a side view showing a cassette-lid opening mechanism of another embodiment in a state obtained with a cassette moved upward.
Figure 5:
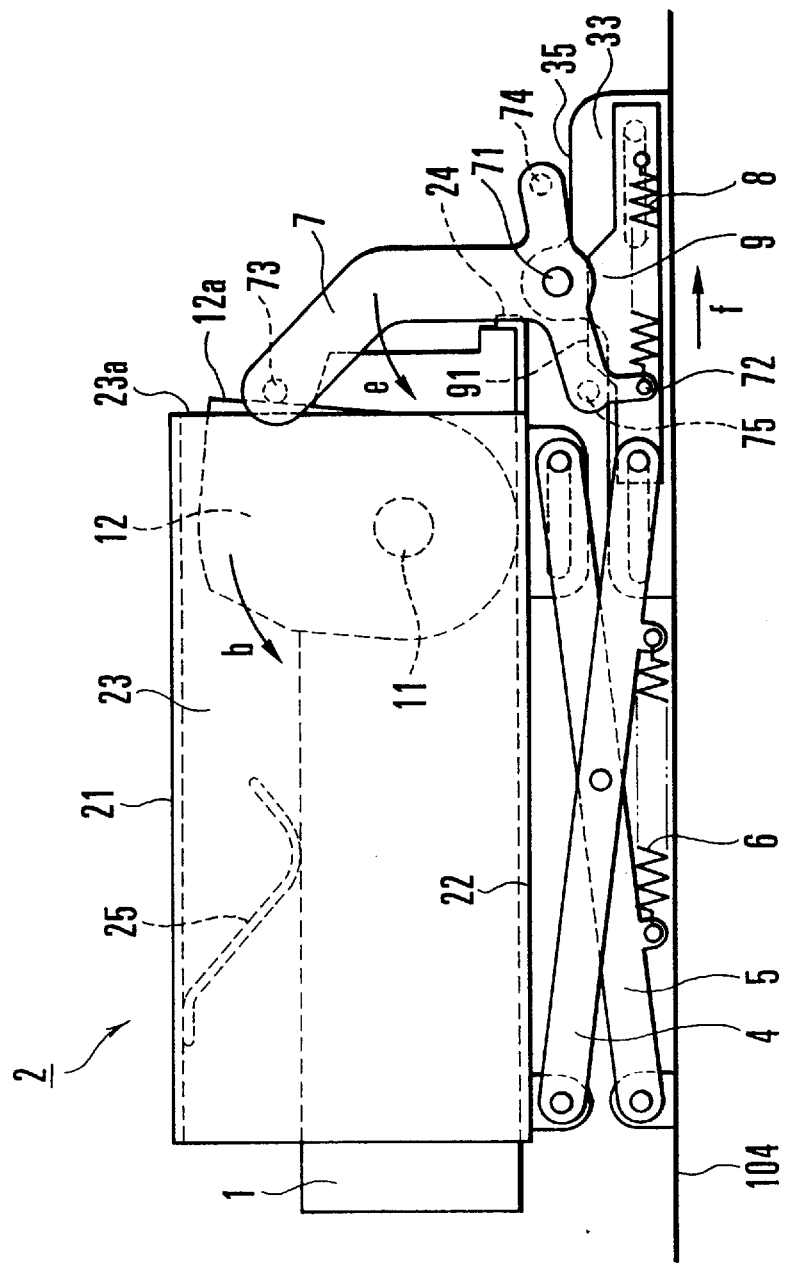
FIG. 5 is a side view showing the embodiment of FIG. 4 in a state obtained with the cassette moved downward.

In the case of the above-described embodiment of this invention, the opener 7 is controlled by means of the cassette holder 2. However, a second embodiment is arranged to control the opener 7 by means of a cassette-holder raising/lowering mechanism, as shown in FIGS. 4 and 5. The second embodiment is arranged as described below.

In FIGS. 4 and 5, all the component parts which are arranged substantially in the same manner as those of the first embodiment described above are indicated by the same reference numerals and the details of them are omitted from the following description. FIGS. 4 and 5 are side views respectively showing the embodiment as having the cassette in a raised position and in a lowered position.

Referring to FIGS. 4 and 5, a restricting plate 9 has one end thereof slidably engage a pin 42 between the guide slot 31 of the support part 33 of the chassis 104 and the arm 4. The other end of the restricting plate 9 slidably engages the guide slot 36 of the support part 33. The upper edge of the restricting plate 9 is formed into a restricting part 91 which protrudes in part. A pin 75 of the opener 7 is arranged to be able to abut on the restricting part 91. The urging spring 8 is stretched between a spring attaching part 92 of the restricting plate 9 and a spring attaching part 72 of the opener 7.

The opener pin 73 which extends laterally across the upper end of the opener 7 is arranged to be able to abut on the lower edge 12a of the side face of the cassette lid 12. However, the front end edge 23a of the side plate 23 of the cassette holder 2 is, on the other hand, set back rearward in such a way as to prevent the front end edge 23a from coming into contact with the opener pin 73.

With the second embodiment arranged as described above, when the cassette 1 is in the raised position as shown in FIG. 4, the urging spring 8 is urging the opener 7 to swing in the direction of arrow "e". The opener 7 is, however, restricted to a position which is located as illustrated in a state of having been swung in the direction of arrow "e", since the pin 75 of the opener 7 is abutting on the restricting part 91 of the restricting plate 9 under this condition.

When the cassette holder 2 is caused to descend against the force of the uplifting spring 6 under this condition, the opener pin 73 comes to abut on the lower edge 12a of the side face of the cassette lid 12. The restricting plate 9 then moves in the direction of arrow "f" accordingly as the pin 42 of the arm 4 moves. However, since the pin 75 of the opener 7 is abutting on the restricting part 91 of the restricting plate 9, the opener pin 73 pushes a point of the cassette lid 12 located away from the support shaft 11 of the cassette lid 12 in the front of the cassette 1. Hence, the pushing action of the opener pin 7 causes the cassette lid 12 to turn in the direction of arrow "b". Therefore, the cassette lid 12 can be very easily and reliably opened without increasing a load imposed on the cassette-lid opening action.

Further, when the cassette holder 2 completes its descent to bring about a state shown in FIG. 5, the cassette holder 2 is locked to the chassis 104 by a locking means which is not shown.

The movement of the restricting plate 9 in the direction of arrow "f" then disengages the restricting part 91 from the pin 75 of the opener 7. The opener 7 is freed from a positional restriction and is swung a little in the direction of arrow "e" by the force of the urging spring 8. Under that condition, the opener pin 73 does not abut on the front end edge 23a of the cassette holder 2. The pin 75 also does not abut on the restricting plate 9. Therefore, the opener pin 73 abuts on the cassette lid 12 in a state of having moved further towards the rear of the cassette 1 than its position obtained during the lid opening process. The opener pin 73 thus urges the cassette lid 12 in the direction of opening until the cassette lid 12 comes to a complete stop. Therefore, the cassette lid 12 can be completely opened to a maximum extent without applying any excessive force to the cassette lid 12. By moving the chassis 104 under that condition, the tape 106 can be wrapped around the rotary drum 102 (FIG. 1) in the same manner as in the case of the first embodiment.

When the cassette 1 is set in a position located farthest away from the rotary drum 102 by moving the chassis 104, the cassette holder 2 is unlocked in FIG. 5. The cassette holder 2 is then allowed to ascend from the state of FIG. 5 to the state of FIG. 4. The opener 7 is swung following the ascent of the cassette holder 2 by an action performed reversely to the action described above. However, since the opener pin 73 is moved downward relative to the cassette holder 2, the cassette lid 12 is caused to be turned in the direction of arrow "a" and closed by the force of a lid closing spring which is not shown.

In the case of the second embodiment, the restricting plate 9 is arranged in the cassette holder raising/lowering mechanism to restrict the swing of the opener 7. The cassette holder 2, therefore, can be simply arranged so as not to have the opener pin 73 of the opener 7 abut on the cassette holder 2.

While some of embodiments of this invention have been described, this invention is not limited to these embodiments described but may be otherwise variously embodied on the basis of the technological concept of this invention. Each of the embodiments described is arranged by way of example to move the cassette holder of a pop-up type-up and down. However, for example, a front-loading type cassette holder may be arranged, in accordance with this invention, to be moved downward after a cassette is horizontally pulled into the cassette holder. In such a case, the cassette can be moved upward and downward by a structural arrangement similar to the arrangement of each of the embodiments described above.

As described in the foregoing, in each of the embodiments, the position of a cassette-lid opening member which is disposed to be urged toward the rear of a cassette is restricted by a restricting means so as to be located further forwardly of the rear of the cassette when the cassette is in the raised position than when the cassette is in the lowered position. When the cassette descends, the arrangement enables the cassette-lid opening member to abut on the cassette lid at a point located away from the center of rotation of the cassette lid in the front of the cassette. Therefore, the arrangement effectively reduces a load imposed on the cassette-lid opening action, so that the cassette lid can be easily and reliably opened. Further, when the cassette is in the lowered position, the cassette lid can be completely closed to a maximum extent in a natural manner.

What is claimed is:

1. A cassette-lid opening device for opening a lid of a cassette as a cassette holder moves downward from a raised position to a lowered position, the cassette having front end at which said lid is located and a rear end, said device comprising:

a) an opening member arranged to abut an exterior surface of said lid, to be movable relative to the cassette and to open the cassette lid as the cassette moves downward by continued engagement with said exterior surface of said lid;

b) an urging member arranged to urge said opening member toward the rear end of the cassette; and c) restricting means for restricting the position of said opening member so as to cause said opening member to be located more forwardly of the rear end of the cassette when the cassette is in the raised position than when the cassette is in the lowered position, said restricting means being disposed exteriorly of said cassette holder and the opening member remains in contact with the restricting means at least from a state that the cassette holder a is at a position to permit the cassette to be inserted into the cassette holder until the opening member gets in contact with the lid.

2. A device according to claim 1, further including the cassette holder which is arranged to have the cassette inserted therein and to be movable upward and downward, said restricting means being disposed with said cassette holder.

3. A device according to claim 2, wherein said restricting means is a restricting part disposed at a front part of said cassette holder.

4. A device according to claim 3, wherein said opening member has a part which is arranged to abut on the restricting part of said cassette holder.

5. A device according to claim 1, further including the cassette holder which is arranged to have the cassette inserted therein and a raising/lowering mechanism arranged to move said cassette holder upward and downward, said restricting means being disposed with said raising/lowering mechanism.

6. A device according to claim 5, wherein said raising/lowering mechanism includes a link, and wherein said restricting means is a restricting member disposed at an end part of said link.

7. A device according to claim 6, wherein said opening member has a part which is arranged to abut on said restricting member.

8. A recording or reproducing apparatus for recording or reproducing information on or from a recording medium contained in a cassette, wherein said cassette has a front end and a rear end, said apparatus comprising:

a) a cassette holder arranged to hold the cassette inserted into the apparatus and to move the cassette upward and downward between a raised position and a lowered position;

b) an opening member arranged to abut an exterior surface of a cassette lid, to be movable relative to the cassette and to open the lid of the cassette as the cassette moves downward by continued engagement with said exterior surface of said lid;

c) an urging member arranged to urge said opening member against said exterior surface of the cassette lid inserted into the cassette holder; and d) restricting means for restricting the position of said opening member so as to cause said opening member to be located less toward the rear end of the cassette inserted into the cassette holder when the cassette is in the raised position than when the cassette is in the lowered position, said restricting means being disposed exteriorly of said cassette holder and the opening member remains in contact with the restricting means at least from a state that the cassette holder is at a position to permit the cassette to be inserted in the cassette holder until the opening member gets in contact with the lid.

9. An apparatus according to claim 8, wherein said restricting means is disposed with said cassette holder.

10. An apparatus according to claim 9, wherein said restricting means is a restricting part disposed in a front part of said cassette holder.

11. An apparatus according to claim 10, wherein said opening member has a part which is arranged to abut on the restricting part of said cassette holder.

12. An apparatus according to claim 8, further including a raising/lowering mechanism arranged to move said cassette holder upward and downward, said restricting means being disposed with said raising/lowering mechanism.

13. An apparatus according to claim 12, wherein said raising/lowering mechanism includes a link, and wherein said restricting means is a restricting member disposed at an end part of said link.

14. An apparatus according to claim 13, wherein said opening member has a part which is arranged to abut on said restricting member.

15. An apparatus according to claim 8, further comprising:

a first chassis on which a drum is mounted for recording or reproducing information on or from the recording medium; and a second chassis arranged to be movable relative to said first chassis and to have said cassette holder mounted thereon.

16. A cassette-lid opening device for opening a lid of a cassette as a cassette holder moves downward from a raised position to a lowered position, the cassette having a front end at which said lid is located and a rear end, said device comprising:

a) an opening member disposed vertically below said cassette lid when said cassette is in said raised position;

b) an urging member arranged to urge said opening member toward the rear end of the cassette; and c) restricting means for restricting the position of said opening member so as to cause said opening member to be located more forwardly of the rear end of the cassette when the cassette is in the raised position than when the cassette is in the lowered position, said restricting means being disposed exteriorly of said cassette holder and the opening member remains in contact with the restricting means at least from a state that the cassette holder is at a position to permit the cassette to be inserted into the cassette holder until the opening member gets in contact with the lid.

17. A recording or reproducing apparatus for recording or reproducing information on or from a recording medium contained in a cassette, wherein said cassette has a front end and a rear end, said apparatus comprising:

a) a cassette holder arranged to hold the cassette inserted into the apparatus and to move the cassette upward and downward between a raised position and a lowered position;

b) an opening member disposed vertically below said cassette lid when a cassette is in said raised position;

c) an urging member arranged to urge said opening member against the cassette lid inserted into the cassette holder; and d) restricting means for restricting the position of said opening member so as to cause said opening member to be located less toward the rear end of the cassette inserted into the cassette holder when the cassette is in the raised position than when the cassette is in the lowered position, said restricting means being disposed exteriorly of said cassette holder and the opening member remains in contact with the restricting means at least from a state that the cassette holder is at a position to permit the cassette to be inserted into the cassette holder until the opening member gets in contact with the lid.

* * * * *

UNITED STATES PATENT AND TRADEMARK OFFICE
CERTIFICATE OF CORRECTION

PATENT NO. : 5,883,754
DATED : March 16, 1999
INVENTOR(S) : Junji Kobayashi

It is certified that error appears in the above-identified patent and that said Letters Patent is hereby corrected as shown below:

Col. 1, line 11, delete "this" and insert -- This --.
Col. 2, line 29, delete "toward" and insert -- downward --.
Col. 7, line 25, delete "holder a is" and insert -- holder is --.
Col. 9, line 1, delete "said" and insert -- a --.
Col. 9, line 2, delete "a" and insert --said--.

Signed and Sealed this

Eleventh Day of January, 2000

Q. TODD DICKINSON

Attest:

Attesting Officer

Acting Commissioner of Patents and Trademarks